United States Patent
Hudson et al.

(10) Patent No.: US 10,662,779 B2
(45) Date of Patent: May 26, 2020

(54) GAS TURBINE ENGINE COMPONENT WITH DEGRADATION COOLING SCHEME

(71) Applicant: United Technologies Corporation, Farmington, CT (US)

(72) Inventors: Eric A. Hudson, Harwinton, CT (US); Tracy A. Propheter-Hinckley, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 458 days.

(21) Appl. No.: 15/353,855

(22) Filed: Nov. 17, 2016

(65) Prior Publication Data
US 2018/0135458 A1    May 17, 2018

(51) Int. Cl.
| F01D 5/28 | (2006.01) |
| F01D 5/18 | (2006.01) |
| F01D 9/06 | (2006.01) |
| F02C 3/04 | (2006.01) |

(52) U.S. Cl.
CPC ............ *F01D 5/186* (2013.01); *F01D 5/288* (2013.01); *F01D 9/065* (2013.01); *F02C 3/04* (2013.01); *F05D 2250/131* (2013.01); *F05D 2250/132* (2013.01); *F05D 2260/201* (2013.01); *Y02T 50/676* (2013.01)

(58) Field of Classification Search
CPC . F01D 5/18; F01D 5/147; F01D 5/186; F01D 5/284; F01D 5/288; F01D 9/065; F05D 2230/90; F05D 2240/123; F05D 2240/124; F05D 2240/305; F05D 2240/306; F05D 2250/131; F05D 2250/132; F05D 2260/201; F05D 2260/231
See application file for complete search history.

(56) References Cited

U.S. PATENT DOCUMENTS

| 3,215,511 A | 11/1965 | Chisholm |
| 4,137,008 A | 1/1979 | Grant et al. |
| 4,247,259 A | 1/1981 | Saboe et al. |
| 4,396,349 A | 8/1983 | Hueber |

(Continued)

FOREIGN PATENT DOCUMENTS

| EP | 0764764 | 3/1997 |
| EP | 1764481 | 3/2007 |

(Continued)

OTHER PUBLICATIONS

U.S. Appl. No. 13/429,474, filed Mar. 26, 2012.

(Continued)

*Primary Examiner* — William H Rodriguez
*Assistant Examiner* — Henry Ng
(74) *Attorney, Agent, or Firm* — Carlson, Gaskey & Olds, P.C.

(57) ABSTRACT

A gas turbine engine component includes a passage and a wall adjacent the passage. The wall includes a first side bordering the passage and a second side opposite the first side. The second side includes an array of cells. The wall also includes an array of channels. Each of the channels is located proximate a corresponding one of the cells. A coating is disposed over the cells. When the coating degrades the channels open to permit impingement air flow through the channel onto sidewalls of the cells.

20 Claims, 4 Drawing Sheets

(56) References Cited

U.S. PATENT DOCUMENTS

| | | |
|---|---|---|
| 4,914,794 A | 4/1990 | Strangman |
| 5,358,379 A | 10/1994 | Pepperman et al. |
| 5,538,380 A | 7/1996 | Norton et al. |
| 5,681,616 A | 10/1997 | Gupta et al. |
| 5,705,231 A | 1/1998 | Nissley et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 | 9/2006 | Harding et al. |
| 7,246,993 B2 * | 7/2007 | Bolms .............. F01D 25/12 415/116 |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,520,725 B1 | 4/2009 | Liang |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,506,243 B2 | 8/2013 | Strock et al. |
| 8,821,124 B2 | 9/2014 | Viens et al. |
| 8,939,706 B1 * | 1/2015 | Lee .............. F01D 11/122 415/1 |
| 9,387,533 B1 * | 7/2016 | Heneveld .............. F01D 5/18 |
| 2003/0231955 A1 * | 12/2003 | Barry .............. F01D 5/186 415/115 |
| 2006/0153685 A1 * | 7/2006 | Bolms .............. C23C 28/3215 416/224 |
| 2008/0056901 A1 * | 3/2008 | Mah .............. F01D 5/141 416/223 R |
| 2008/0159850 A1 | 7/2008 | Tholen et al. |
| 2009/0074576 A1 * | 3/2009 | Brostmeyer .............. F01D 5/186 416/95 |
| 2010/0136258 A1 | 6/2010 | Strock et al. |
| 2011/0189015 A1 * | 8/2011 | Shepherd .............. F01D 5/186 416/95 |
| 2016/0090851 A1 | 3/2016 | Carr et al. |
| 2016/0208649 A1 * | 7/2016 | Didion .............. F01D 11/08 |
| 2018/0135419 A1 * | 5/2018 | Propheter-Hinckley .............. F01D 9/041 |
| 2018/0135421 A1 * | 5/2018 | Propheter-Hinckley .............. F04D 29/388 |
| 2018/0135429 A1 * | 5/2018 | Propheter-Hinckley .............. F01D 5/187 |
| 2018/0135435 A1 * | 5/2018 | Propheter-Hinckley .............. F04D 29/541 |
| 2018/0135439 A1 * | 5/2018 | Devore .............. F01D 5/288 |
| 2018/0135441 A1 * | 5/2018 | Hudson .............. F02C 3/04 |
| 2018/0135443 A1 * | 5/2018 | Propheter-Hinckley .............. F01D 9/02 |
| 2018/0135451 A1 * | 5/2018 | Propheter-Hinckley .............. F01D 11/005 |
| 2018/0135464 A1 * | 5/2018 | Propheter-Hinckley .............. F01D 25/28 |

FOREIGN PATENT DOCUMENTS

| | | | |
|---|---|---|---|
| EP | 2105579 | 9/2009 | |
| EP | 2354453 | 8/2011 | |
| EP | 2815823 | 12/2014 | |
| EP | 2815823 A1 * | 12/2014 | ......... C22C 19/057 |
| EP | 2853688 | 4/2015 | |
| EP | 3054105 | 8/2016 | |
| GB | 2272453 | 5/1994 | |
| JP | 61066802 | 4/1986 | |
| JP | 05321602 | 12/1993 | |
| WO | 2016133579 | 8/2016 | |

OTHER PUBLICATIONS

U.S. Appl. No. 14/659,718, filed Mar. 17, 2015.
U.S. Appl. No. 14/812,668, filed Jul. 29, 2015.
Extended European Search Report for European Patent Application No. 17202390.5 completed Jun. 12, 2018.

* cited by examiner

GAS TURBINE ENGINE COMPONENT WITH DEGRADATION COOLING SCHEME

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A gas turbine engine according to an example of the present disclosure includes a passage and a wall adjacent the passage. The wall has a first side that borders the passage, and a second side opposite the first side. The second side includes an array of cells, and an array of channels. Each of the channels are located proximate a corresponding one of the cells, and a coating is disposed in the array of cells.

In a further embodiment of any of the foregoing embodiments, each of the channels has a sacrificial plug blocking fluid communication through the respective channel from the passage to the corresponding one of the cells.

In a further embodiment of any of the foregoing embodiments, the sacrificial plug is a thin bridge portion of the wall.

In a further embodiment of any of the foregoing embodiments, the array of cells is defined by cell sidewalls having a cell wall thickness, and the sacrificial plug has a thickness that is less than the cell wall thickness.

In a further embodiment of any of the foregoing embodiments, the sacrificial plug is a thin bridge portion of the wall. The array of cells is defined by cell sidewalls having a cell wall thickness, and the thin bridge portion has a bridge thickness that is less than the cell wall thickness.

In a further embodiment of any of the foregoing embodiments, the array of cells is defined by cell sidewalls, and the channels slope along directions that intersect the cell sidewalls.

In a further embodiment of any of the foregoing embodiments, the array of channels includes at least two channels located proximate a common one of the cells.

In a further embodiment of any of the foregoing embodiments, each of the channels tapers.

In a further embodiment of any of the foregoing embodiments, the array of channels includes a number of channels and the array of cells includes a number of cells, and a ratio of the number of channels to the number of cells is equal to or greater than 2:1.

In a further embodiment of any of the foregoing embodiments, the coating is ceramic.

In a further embodiment of any of the foregoing embodiments, the cells are polygonal.

In a further embodiment of any of the foregoing embodiments, the array of cells is defined by cell sidewalls of uniform thickness.

In a further embodiment of any of the foregoing embodiments, each of the channels has a sacrificial plug blocking fluid communication through the respective channel from the passage to the corresponding one of the cells. The sacrificial plug is a thin bridge portion of the wall. The array of cells is defined by cell sidewalls having a cell wall thickness. The thin bridge portion has a bridge thickness that is less than the cell wall thickness, and the channels are sloped in directions that intersect the cell sidewalls.

In a further embodiment of any of the foregoing embodiments, the array of channels includes at least two channels located proximate a common one of the cells.

A gas turbine engine according to an example of the present disclosure includes a compressor section, a combustor in fluid communication with the compressor section, and a turbine section in fluid communication with the combustor. At least one of the turbine section or the compressor section has a component that has a passage, and a wall adjacent the passage. The wall includes a first side bordering the passage, and a second side opposite the first side. The second side has an array of cells, and an array of channels. Each of the channels are located proximate a corresponding one of the cells, and a coating is disposed in the array of cells.

In a further embodiment of any of the foregoing embodiments, each of the channels has a sacrificial plug blocking fluid communication through the channel from the passage to the corresponding one of the cells, and the sacrificial plug is a thin bridge portion of the wall.

In a further embodiment of any of the foregoing embodiments, the array of cells is defined by cell sidewalls having a cell wall thickness, and the sacrificial plug has a plug thickness that is less than the cell wall thickness.

In a further embodiment of any of the foregoing embodiments, the array of cells is defined by cell sidewalls having a cell wall thickness, and the sacrificial plug has a plug thickness that is less than the cell wall thickness.

In a further embodiment of any of the foregoing embodiments, each of the channels tapers.

In a further embodiment of any of the foregoing embodiments, each of the channels has a sacrificial plug blocking fluid communication through the channel from the passage to the corresponding one of the cells. The sacrificial plug is a thin bridge portion of the wall. The array of cells is defined by cell sidewalls having a cell wall thickness. The thin bridge portion has a bridge thickness that is less than the cell wall thickness, and the channels are sloped in directions that intersect the cell sidewalls.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
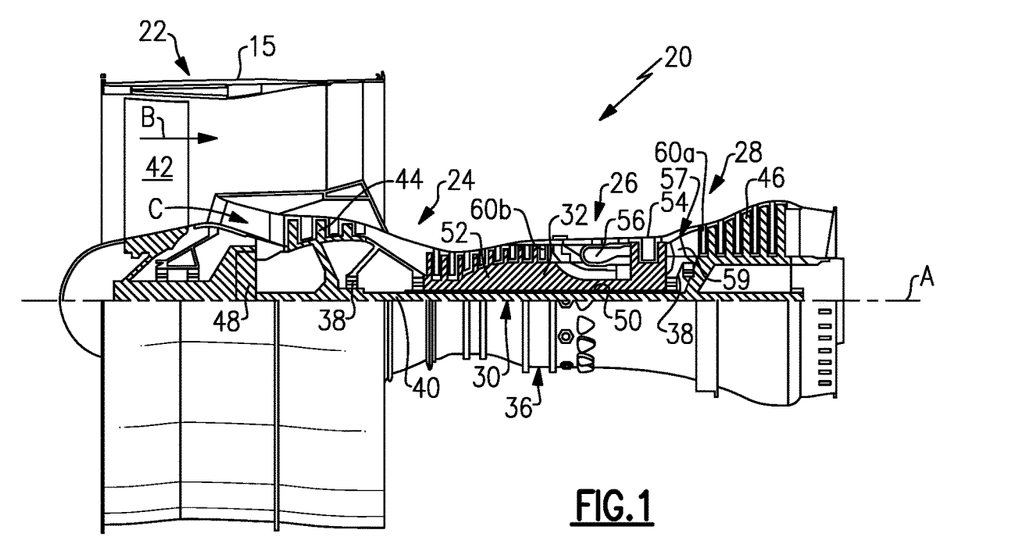
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,°\, R.)/(518.7°\, R.)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures.

Figure 2A:
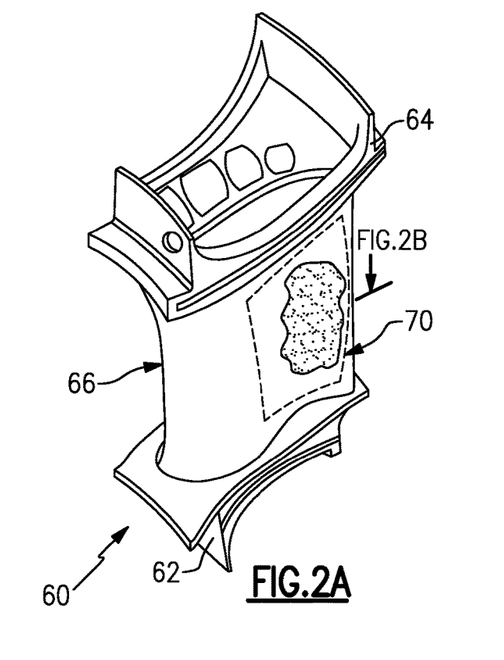
FIG. 2A illustrates an example airfoil in the gas turbine engine.
Figure 2B:
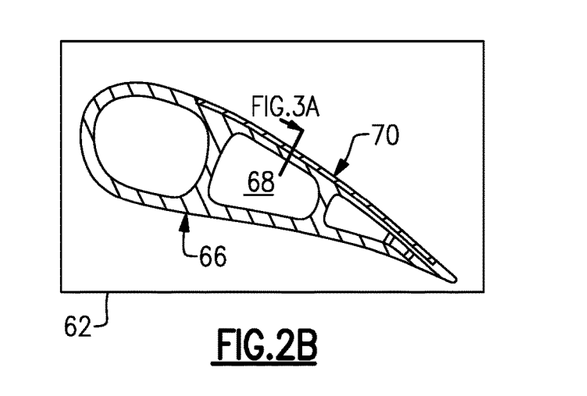
FIG. 2B illustrates a sectioned view of the airfoil of FIG. 2A.

FIG. 2A illustrates one such component. In this example, the component 60 is an airfoil, namely a vane. For instance, the component 60 can be a turbine vane, as represented at 60a in FIG. 1, or a compressor vane, as represented at 60b in FIG. 1. As will be appreciated, although the examples herein are described in the context of a vane, this disclosure is not limited to vanes or airfoils, and the examples may also be applicable to blade outer air seals or other components that are exposed to high temperatures in the core flow path.

The component 60 includes inner and outer platforms 62/64 and an airfoil section 66 that extends radially between the inner and outer platforms 62/64. In this example, the airfoil section 66 is hollow and includes one or more internal passages 68. A passage can include a cavity, a channel, or the like.

To enhance the temperature resistance capability of the component 60, the airfoil section 66 includes a geometric segmented coating section 70. The coating section 70 may be integral with the airfoil section 66 or may be a segment or panel that forms a portion of the airfoil section 66. In this example, the coating section 70 is located on a suction side of the airfoil section 66. Alternatively or additionally, a coating section 70 could also be provided on the pressure side of the airfoil section 66, on the inner and/or outer platforms 62/64, or on other portions of the airfoil 66. As will be described in further detail below, the coating section 70 includes a "degradation" cooling scheme to enhance temperature resistance capability of the component 60 as the geometric segmented coating section 70 degrades.

Figure 3A:
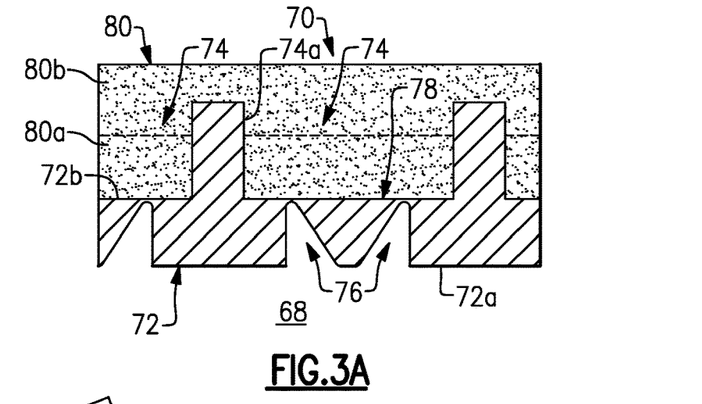
FIG. 3A illustrates a sectioned view through a segmented coating section of the airfoil.
Figures 3B, 4A:
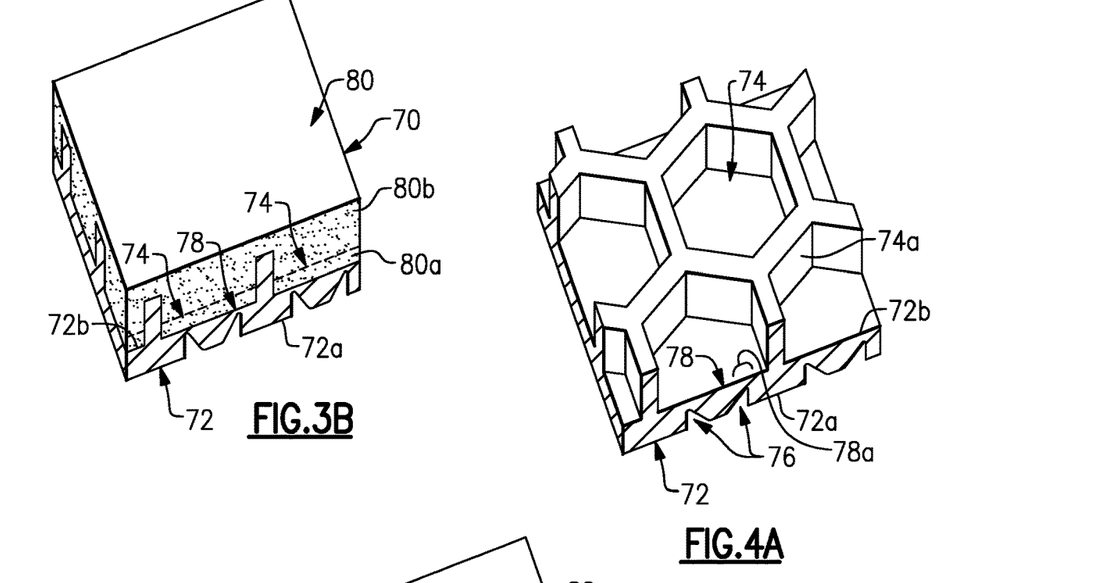
FIG. 3B illustrates a perspective view of the segmented coating section of FIG. 3A.
FIG. 4A illustrates a wall of the segmented coating section, without the coating.

FIG. 3A illustrates a sectioned view through the coating section 70, and FIG. 3B illustrates a sectioned perspective view of the coating section 70. The coating section 70 includes a wall 72 that is located adjacent the passage 68 in the airfoil section 66. The wall 72 includes a first side 72a that borders the passage 68 and a second side 72b that is opposite the first side 72a. The second side 72b includes an array of cells 74 defined by cell sidewalls 74a. In this example, the cell sidewalls 74a have a uniform thickness. Most typically, the array of cells 74 will be hexagonal or other polygonal geometry. However, the cells can have virtually any geometric repeating pattern, including cells of different geometries.

An array of channels 76 is located proximate corresponding ones of the cells 74. In this example, each of the channels 76 has a sacrificial plug 78 that blocks fluid communication through the channels 76 from the passage 68 to the corresponding cells 74.

A coating 80 is disposed in the array of cells 74. The cells 74 mechanically facilitate bonding of the coating 80 on the wall 72. The coating 80 is a barrier coating, such as a thermal barrier or environmental barrier, which is formed of a ceramic. A ceramic is a compound of metallic or metalloid elements bonded with nonmetallic elements or metalloid elements primarily in ionic or covalent bonds. Example ceramics may include, but are not limited to, oxides, carbides, nitrides, borides, silicides, and combinations thereof. The coating 80 may be a monolayer coating but more typically will be a multi-layer coating. For instance, the coating 80 has a first coating layer 80a and a second coating layer 80b. In this example, the second coating layer 80b is a topcoat.

The ceramic material of the coating 80 provides thermal and/or environmental resistance. As an example, the ceramic material may include or may be yttria stabilized with zirconia, hafnia, and/or gadolinia, gadolinia zirconate, molybdate, alumina, or combinations thereof.

The coating 80 may also include a bond coat for attaching the ceramic material to the wall 72 and cells 74. The wall 72 and cells 74 may be formed of an alloy. Example alloys may include, but are not limited to, nickel alloys, cobalt alloys, a nickel alloy coated with cobalt or cobalt alloy, or a non-nickel alloys that do not substantially react with ceramic. For example, the bond coat may include a nickel alloy, platinum, gold, silver, or MCrAlY, where the M includes at least one of nickel, cobalt, iron, or combinations thereof.

The cell sidewalls 74a also facilitate reducing internal stresses in the coating 80 that may occur from sintering at relatively high surface temperatures during use in the engine 20. The sintering may result in partial melting, densification, and diffusional shrinkage of the coating 80 and thereby induce internal stresses. The cell sidewalls 74a serve to produce faults in at least the portion of the coating 80. The faults provide locations for releasing energy associated with the internal stresses (e.g., reducing shear and radial stresses). That is, the energy associated with the internal stresses may be dissipated in the faults such that there is less energy available for causing delamination cracking between the coating 80 and the underlying wall 72.

Figure 4B:
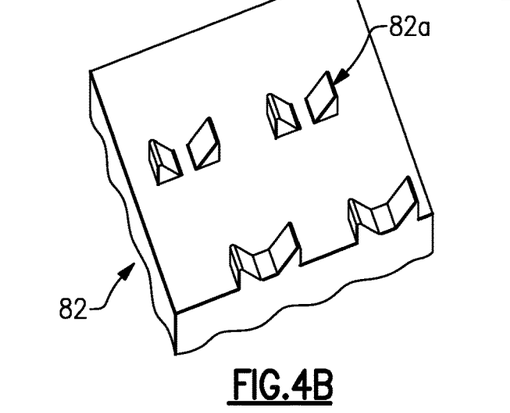
FIG. 4B illustrates a mold core that can be used to form channels in the wall of FIG. 4A.

The coating section 70 may be formed using several different fabrication techniques. As an example, the wall 72 may be fabricated by investment casting, additive manufacturing, brazing, electro-discharge machining (EDM), or combinations thereof, but is not limited to such techniques. In one example shown in FIG. 4A, the wall 72 is depicted without the coating 80. The channels 76 on the first side 72a of the wall 72 are formed by positive features in an investment casting mold core. For instance, FIG. 4B illustrates a mold core 82 having positive features 82a that correspond to the negative geometry of the channels 76 in the wall 72. The cells 74 can be formed by additive manufacturing or may be separately fabricated and brazed to the remaining portion of the wall 72, which can be investment cast or additively fabricated. Alternatively, the cells 74 can be formed by other techniques, such as depositing an alloy coating and removing sections of the alloy coating by machining, EDM, or other removal process.

To produce the coating 80, ceramic coating material is deposited over the cells 74. The deposition process can include, but is not limited to, plasma spray or physical vapor deposition. The ceramic coating material fills or substantially fills the cells 74 and is deposited in a thickness that is greater than the height of the cell sidewalls 74a. At this stage, the surface of the coating may have contours from the underlying cells 74. The surface may be machined, ground, or abraded flat. For instance, the surface is reduced down to or close to the tops of the cell sidewalls 74a. Additional coating material can then be deposited onto the flat surface as the second coating layer 80b.

Figure 5A:
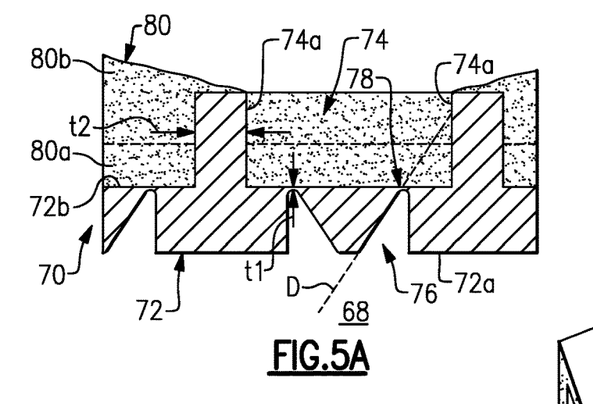
FIGS. 5A, 6A, and 7A illustrate progressive degradation of a coating and opening of a channel for impingement cooling.
Figure 5B:
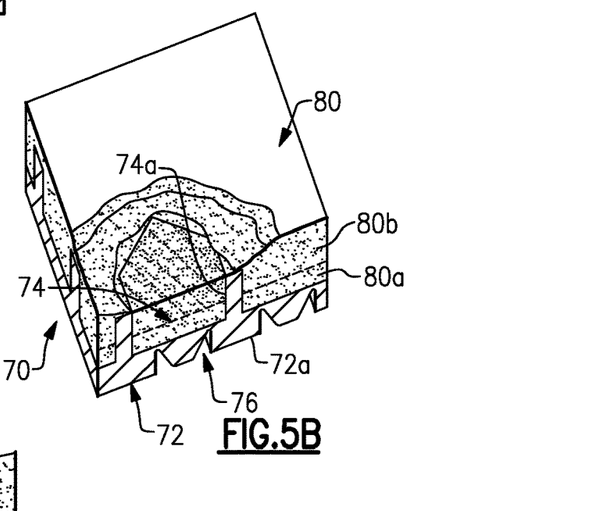
FIGS. 5B, 6B, and 7B illustrate perspective views corresponding, respectively, to FIGS. 5A, 6A, and 7A.
Figure 6A:
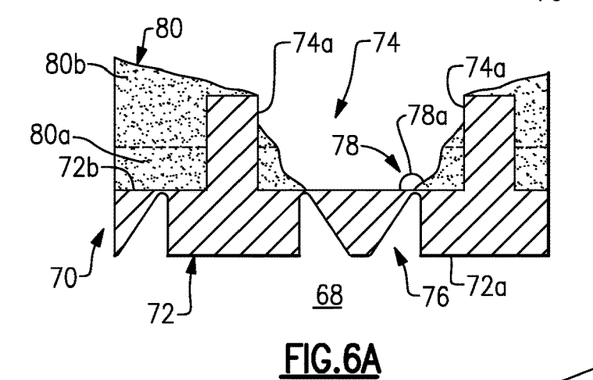
Figure 6B:
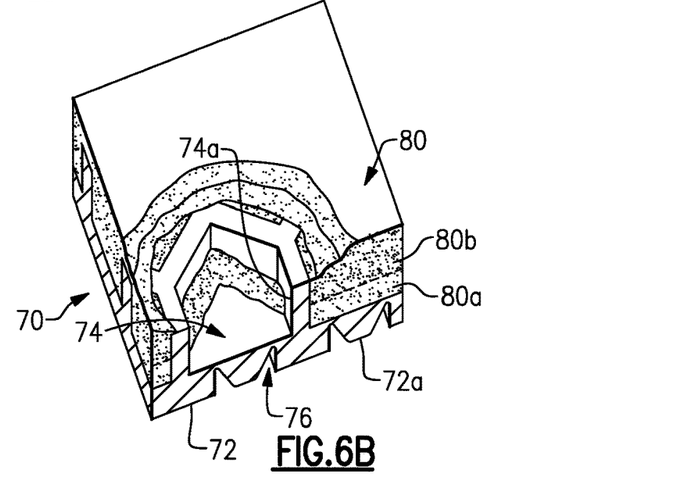
Figure 7A:
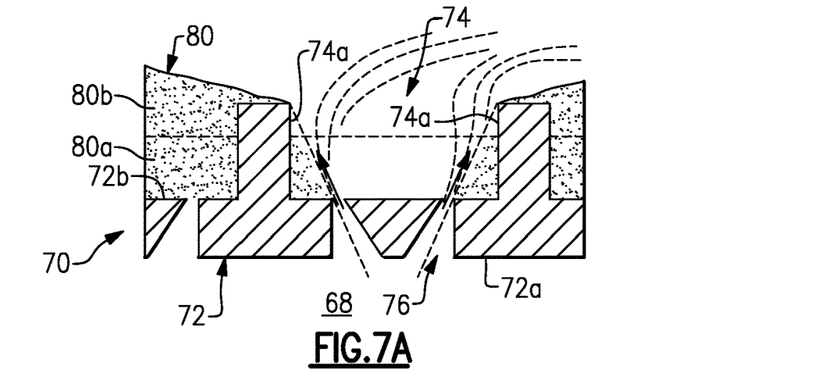
Figure 7B:
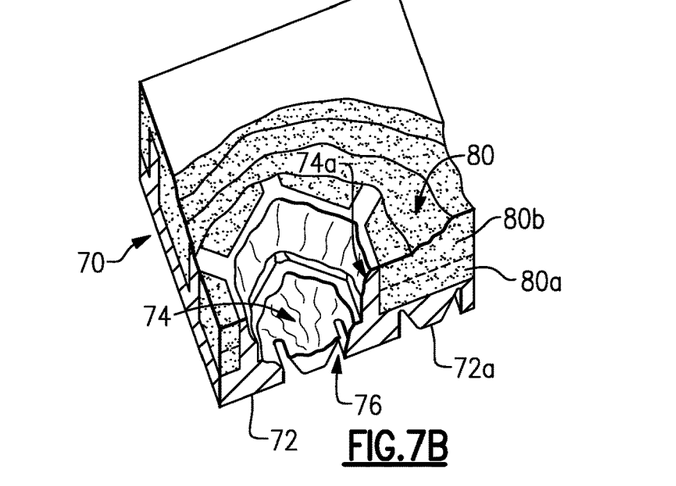

FIGS. 5-7 illustrate the degradation cooling scheme of the component 60, specifically in the coating section 70. The illustrations progressively show the degradation. For instance, FIG. 5A is a first progression, FIG. 6A is a second progression, and FIG. 7A is a final progression. FIG. 5B shows a perspective view of FIG. 5A, FIG. 6B shows a perspective view of FIG. 6A, and FIG. 7B shows a perspective view of FIG. 7A.

As shown through the progressions, the coating 80 is lost during use of the component 60, such as by erosion, corrosion, or combinations thereof. Initially, as shown in FIGS. 5A and 5B, the second coating layer 80b, or a portion thereof, is lost by degradation. In the second progression shown in FIGS. 6A and 6B, the second coating layer 80b continues to be lost and a portion of the first coating layer 80a in the cell 74 is also lost. Once the coating 80 degrades down to the bottom of the cell 74, the sacrificial plug 78 is also lost, which opens the channels 76. The sacrificial plug 78 is an element, portion, or section that temporarily blocks fluid communication through the channel 76. As the exposed wall at the bottom of the cell 74 degrades, the thin sacrificial plug 78 erodes, resulting in a flow communication opening from the channel 76.

Once the channel 76 is open, air from the passage 68 (i.e., compressor bleed air) can flow through the channel 76 to cool the cell sidewalls 74a. Thus, up until one or more of the channels 76 open, the component 60 utilizes less compressor bleed air. Moreover, bleed air for cooling the cell sidewalls 74 is only used as needed when a channel 76 opens. The coating 80 and the sacrificial plug 78 thus provide a passive mechanism to manage and limit use of bleed air.

In further examples, the channels 76 may be sloped in directions that intersect the cell sidewalls 74a. For example, as shown in FIG. 5A, the channel 76 is sloped along direction D which, extended out, intersects one of the sidewalls 74a. Thus, when the sacrificial plug 78 is lost and the channel 76 opens, the air is directed through the channel 76 to impinge upon the cell sidewalls 74a. In contrast, if a channel were instead vertical, the air would be more likely to jet into the core flow path without impinging upon, and cooling, the cell sidewalls 74a. The cooling of the cell sidewalls 74a enhances the wall durability and thus facilitates reducing the potential for loss of the coating 80 in adjacent cells 74 that might otherwise more easily occur without the cell sidewall 74a.

The component 60 may include one channel 76 for each one of the cells 74. For greater cooling effect, multiple channels 76 may be provided for each one of the cells 74. For example, the component 60 includes a number of the channels 76 and a number of the cells 74, and a ratio of the number of channels 76 to the number of cells 74 is equal to or greater than 2:1. For instance, a ratio of 2:1 in combination with a high-aspect channel cross-section provides the ability to cool opposed halves of a cell 74. In further examples, the ratio may be 3:1, 4:1, or up to 10:1.

In the illustrated example, there are two channels 76 for each one of the cells 74. The channels 76 slope in different directions such that once opened, air directed through the channels 76 impinges upon different portions of the cell sidewalls 74a. The channels 76 may also taper (FIG. 5A). In this example, the taper is from the first side 72a toward the second side 72b but alternatively could be tapered from the second side 72b toward the first side 72a. The taper serves to accelerate or decelerate air flow and may produce a jetting effect to impinge upon the cell sidewalls 74a. The taper may also serve as a self-healing type feature to provide more air flow as the bottom of the cell 74 erodes away and progressively opens larger cross-sections of the channel 76. Similarly, an inverse taper may provide less air flow as the bottom of the cell 74 erodes away and progressively opens smaller cross-sections of the channel 76. The channels 76 have a generally triangular profile. However, it is to be understood that the channels 76 could have other shapes and are not limited to a triangular geometries. For instance, the channels 76 could be cylindrical, elliptical cylindrical, or polygonal cylindrical, each of which may taper.

In the illustrated examples, the sacrificial plug 78 is a thin bridge portion 78a (FIGS. 4A and 6A) of the wall 72. For instance, the thin bridge portion 78a is formed during investment casting or additive manufacturing of the wall 72 and is thus formed from the same material, such as nickel alloy, as the remainder of the wall 72. Generally, however, the sacrificial plug 78 has a lower resistance to degradation than the cell sidewalls 74a. This ensures that the sacrificial plug 78 is lost before the cell sidewalls 74a are lost, which would otherwise expose the next cell 74 and lead to further degradation. One approach is to form the thin bridge portion 78a to be thinner than the thickness of the cell sidewalls 74a. As an example, the thin bridge portion 78a has a thickness t1 (FIG. 5A) and the cell sidewalls have a thickness t2. The thickness t1 is less than the thickness t2. In some examples, the thickness t1 is less than the thickness t2 by a factor from two to ten. The thickness of the bridge portion 78a should not be so thin, however, that the structural integrity of the wall 72 is substantially compromised upon degradation of the bridge portion 78a.

As can be appreciated from the described degradation cooling scheme, the opening of the channels 76 to provide impingement cooling on the side sidewalls 74a enhances the temperature capability of the cell sidewalls 74a and thus extends the durability of the component 60.

Figure 8:
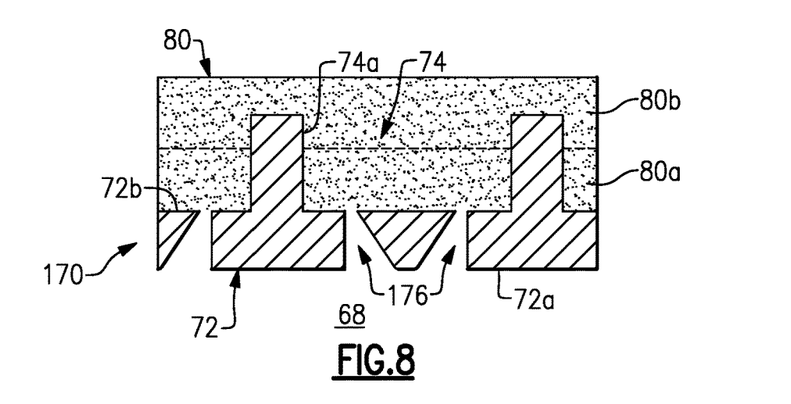
FIG. 8 illustrates another example geometric segmented coating section.

FIG. 8 illustrates another example geometric segmented coating section 170. In this disclosure, like reference numerals designate like elements where appropriate and reference numerals with the addition of one-hundred or multiples thereof designate modified elements that are understood to incorporate the same features and benefits of the corresponding elements. In this example, the sacrificial plugs 78 are excluded and the channels 176 open directly to the coating 80. Thus, once the coating 80 degrades or erodes away, the channels 176 open to provide air flow onto the cell sidewalls 74a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine component comprising:
   a passage;
   a wall adjacent the passage, the wall including:
      a first side bordering the passage,
      a second side opposite the first side, the second side including an array of closed-sided cells defined by cell sidewalls, and
      an array of channels, each of the channels being located proximate a corresponding one of the closed-sided cells, the array of channels including pairs of channels, each pair of channels being associated with a different common one of the closed-sided cells in that channel axes of the pair of channels intersect the common closed-sided cell, the channel axes of the two channels being divergent an intersecting the cell sidewalls; and a coating disposed in the array of closed-sided cells.

2. The gas turbine engine component as recited in claim 1, wherein each of the channels has a sacrificial plug blocking fluid communication through the respective channel from the passage to the corresponding one of the closed-sided cells.

3. The gas turbine engine component as recited in claim 2, wherein the sacrificial plug is a thin bridge portion of the wall.

4. The gas turbine engine component as recited in claim 2, wherein the cell sidewalls have a cell wall thickness, and the sacrificial plug has a thickness that is less than the cell wall thickness.

5. The gas turbine engine component as recited in claim 2, wherein the sacrificial plug is a thin bridge portion of the wall, the cell sidewalls have a cell wall thickness, and the thin bridge portion has a bridge thickness that is less than the cell wall thickness.

6. The gas turbine engine component as recited in claim 1, wherein each of the channels tapers.

7. The gas turbine engine component as recited in claim 1, wherein the coating is ceramic.

8. The gas turbine engine component as recited in claim 1, wherein the closed-sided cells are polygonal.

9. The gas turbine engine component as recited in claim 1, wherein the cell sidewalls are of uniform thickness.

10. The gas turbine engine component as recited in claim 1, wherein each of the channels has a sacrificial plug blocking fluid communication through the respective channel from the passage to the corresponding one of the closed-sided cells, the sacrificial plug is a thin bridge portion of the wall, the cell sidewalls have a cell wall thickness, the thin bridge portion has a bridge thickness that is less than the cell wall thickness, and the channels are sloped in directions that intersect the cell sidewalls.

11. The gas turbine engine component as recited in claim 1, wherein the closed-sided cells are polygonal.

12. A gas turbine engine comprising:
a compressor section;
a combustor in fluid communication with the compressor section; and
a turbine section in fluid communication with the combustor,
at least one of the turbine section or the compressor section including a component having a passage,
a wall adjacent the passage, the wall including:
a first side bordering the passage,
a second side opposite the first side, the second side including an array of closed-sided cells defined by cell sidewalls, and
an array of channels, each of the channels being located proximate a corresponding one of the closed-sided cells, the array of channels including pairs of channels, each pair of channels being associated with a different common one of the closed-sided cells in that channel axes of the pair of channels intersect the common closed-sided cell, the channel axes of the two channels being divergent and intersecting the cell sidewalls, and a coating disposed in the array of closed-sided cells.

13. The engine as recited in claim 12, wherein each of the channels has a sacrificial plug blocking fluid communication through the channel from the passage to the corresponding one of the closed-sided cells, and the sacrificial plug is a thin bridge portion of the wall.

14. The engine as recited in claim 13, wherein the cell sidewalls have a cell wall thickness, and the sacrificial plug has a plug thickness that is less than the cell wall thickness.

15. The engine as recited in claim 12, wherein each of the channels tapers.

16. The engine as recited in claim 12, wherein each of the channels has a sacrificial plug blocking fluid communication through the channel from the passage to the corresponding one of the cells, the sacrificial plug is a thin bridge portion of the wall, the cell sidewalls have a cell wall thickness, the thin bridge portion has a bridge thickness that is less than the cell wall thickness, and the channels are sloped in directions that intersect the cell sidewalls.

17. A gas turbine engine component comprising:
a passage;
a wall adjacent the passage, the wall including:
a first side bordering the passage,
a second side opposite the first side, the second side including an array of closed-sided cells defined by cell sidewalls, and
an array of channels, each of the channels being located proximate a corresponding one of the closed-sided cells, wherein each of the channels has a sacrificial plug blocking fluid communication through the respective channel from the passage to the corresponding one of the closed-sided cells, the sacrificial plug is a thin bridge portion of the wall, the cell sidewalls have a cell wall thickness, and the thin bridge portion has a bridge thickness that is less than the cell wall thickness; and
a coating disposed in the array of closed-sided cells.

18. The gas turbine engine component as recited in claim 17, wherein the coating is ceramic and the cell sidewalls are of uniform thickness.

19. The gas turbine engine component as recited in claim 18, wherein the array of channels includes pairs of channels, each pair of channels is associated with a different common one of the closed-sided cells in that channel axes of the pair of channels intersect the common closed-sided cell.

20. The gas turbine engine component as recited in claim 19, wherein the channel axes of the two channels are divergent and the channel axes intersect the cell sidewalls.

* * * * *